US010088042B2

(12) United States Patent
Moreno Colom et al.

(10) Patent No.: US 10,088,042 B2
(45) Date of Patent: Oct. 2, 2018

(54) SHIFT SELECTOR MECHANISM FOR MOTOR VEHICLE TRANSMISSIONS

(71) Applicant: FICO TRIAD, S.A., Barcelona (ES)

(72) Inventors: Javier Moreno Colom, Viladecavalls (ES); Santiago Gimeno Grané, Viladecavalls (ES)

(73) Assignee: Fico Triad, S.A., Barcelona (ES)

( * ) Notice: Subject to any disclaimer, the term of this patent is extended or adjusted under 35 U.S.C. 154(b) by 0 days.

(21) Appl. No.: 15/222,809

(22) Filed: Jul. 28, 2016

(65) Prior Publication Data

US 2017/0037962 A1 Feb. 9, 2017

(30) Foreign Application Priority Data

Aug. 5, 2015 (EP) .................... 15179896

(51) Int. Cl.
*F16H 61/24* (2006.01)
*F16H 59/02* (2006.01)
*F16H 59/10* (2006.01)

(52) U.S. Cl.
CPC .......... *F16H 61/24* (2013.01); *F16H 59/0208* (2013.01); *F16H 2059/0269* (2013.01); *F16H 2059/0295* (2013.01); *F16H 2061/243* (2013.01)

(58) Field of Classification Search
CPC ...... F16H 59/02; F16H 61/24; F16H 59/0208; F16H 2061/243; F16H 2059/047; F16H 2061/247; F16H 63/38; F16H 25/18; F16H 2059/0269; F16H 2059/0295; G05G 1/04; G05G 1/12; G05G 5/06; G05G 5/065; G05G 5/08; G05G 2700/14; B60T 7/104; H01H 3/50
See application file for complete search history.

(56) References Cited

U.S. PATENT DOCUMENTS

| | | | | |
|---|---|---|---|---|
| 4,768,393 A * | 9/1988 | Beaman | | B60K 20/02 403/225 |
| 5,477,742 A * | 12/1995 | Burger | | F16H 61/24 74/473.26 |
| 6,026,698 A * | 2/2000 | Weston | | F16H 3/0915 74/335 |
| 7,246,538 B2 * | 7/2007 | Hermansson | | G05G 9/047 24/33 P |

(Continued)

FOREIGN PATENT DOCUMENTS

| | | | |
|---|---|---|---|
| DE | 10148554 C1 * | 3/2003 | ........... B60Q 1/1461 |
| DE | 102005014303 A1 * | 10/2006 | ............. F16H 63/38 |

(Continued)

OTHER PUBLICATIONS

European Search Report for EP 15179896.4, dated Feb. 10, 2016, 14 pp.

*Primary Examiner* — Adam D Rogers
(74) *Attorney, Agent, or Firm* — Squire Patton Boggs (US) LLP

(57) ABSTRACT

The mechanism includes a first part and a second part movable relative to the first part, a spring member acting on the second part such that the second part is biased onto a contoured surface, and a damper element for absorbing impacts to the first part associated with one of the first part and the second part such that movement of the second part relative to the first part causes movement of the damper element relative to one of the first part and the second part without contacting the other of the first part and the second part.

13 Claims, 4 Drawing Sheets

(56) References Cited

U.S. PATENT DOCUMENTS

| | | | | |
|---|---|---|---|---|
| 7,467,569 | B2 * | 12/2008 | Wang | F16H 61/24 74/473.21 |
| 7,543,515 | B2 * | 6/2009 | Doerr | F16H 59/70 74/335 |
| 7,661,334 | B2 | 2/2010 | Giefer et al. | |
| 7,750,624 | B2 * | 7/2010 | Heo | F16H 59/0204 324/207.23 |
| 7,814,810 | B2 * | 10/2010 | Mitteer | F16H 61/22 192/220.2 |
| 8,726,756 | B2 * | 5/2014 | Moreno Colom | F16H 59/044 74/471 XY |
| 9,664,276 | B2 * | 5/2017 | TenBrink | F16H 59/10 |
| 2004/0112162 | A1 | 6/2004 | Hermanson | |
| 2004/0226801 | A1 | 11/2004 | De Jonge et al. | |
| 2006/0185467 | A1 | 8/2006 | Giefer et al. | |
| 2008/0163714 | A1 | 7/2008 | Wang | |
| 2016/0101804 | A1 * | 4/2016 | Kikuchi | F16H 25/18 74/569 |
| 2017/0089458 | A1 * | 3/2017 | Schirmer | F16H 61/24 |

FOREIGN PATENT DOCUMENTS

| | | | | |
|---|---|---|---|---|
| DE | 102009058719 | A1 * | 6/2011 | B60Q 1/1469 |
| DE | 102010034280 | A1 * | 2/2012 | F16H 59/70 |
| DE | 102014213599 | A1 * | 1/2016 | F16H 61/24 |
| DE | 102015003553 | A1 * | 9/2016 | G05G 5/06 |
| EP | 255418 | A1 * | 2/1988 | |
| EP | 1361112 | A2 * | 11/2003 | B60Q 1/1469 |
| EP | 1544515 | A1 * | 6/2005 | F16H 63/38 |
| EP | 2112408 | A1 | 10/2009 | |
| EP | 2184517 | A1 * | 5/2010 | F16H 59/044 |

\* cited by examiner

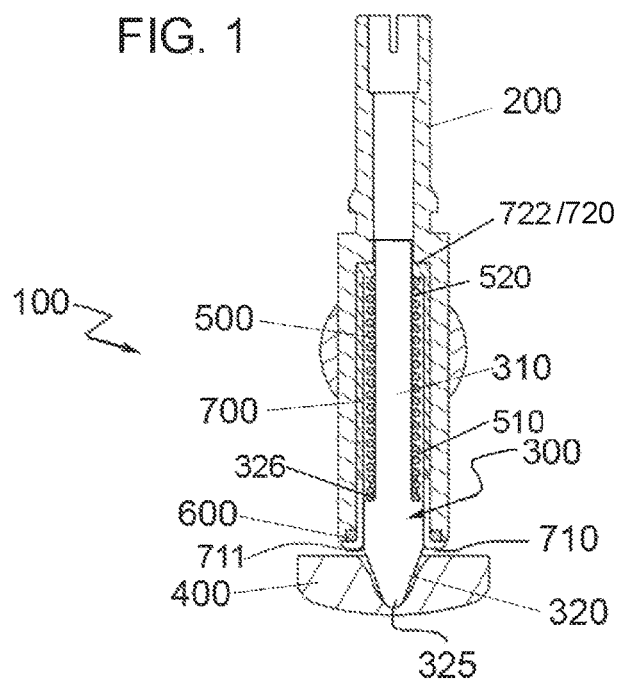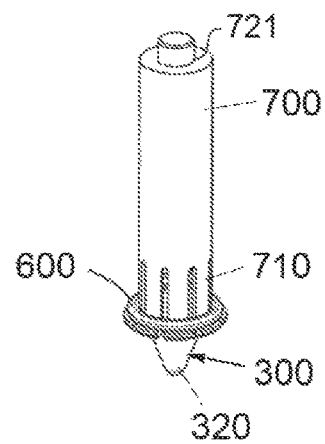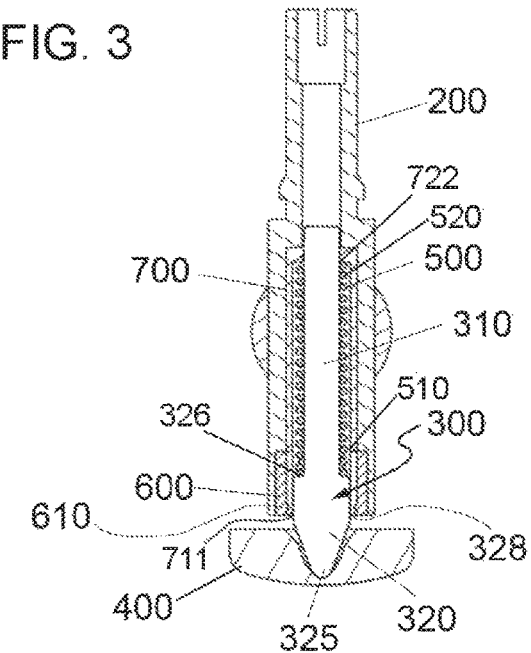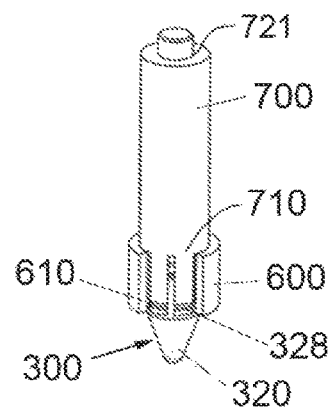

FIG. 7
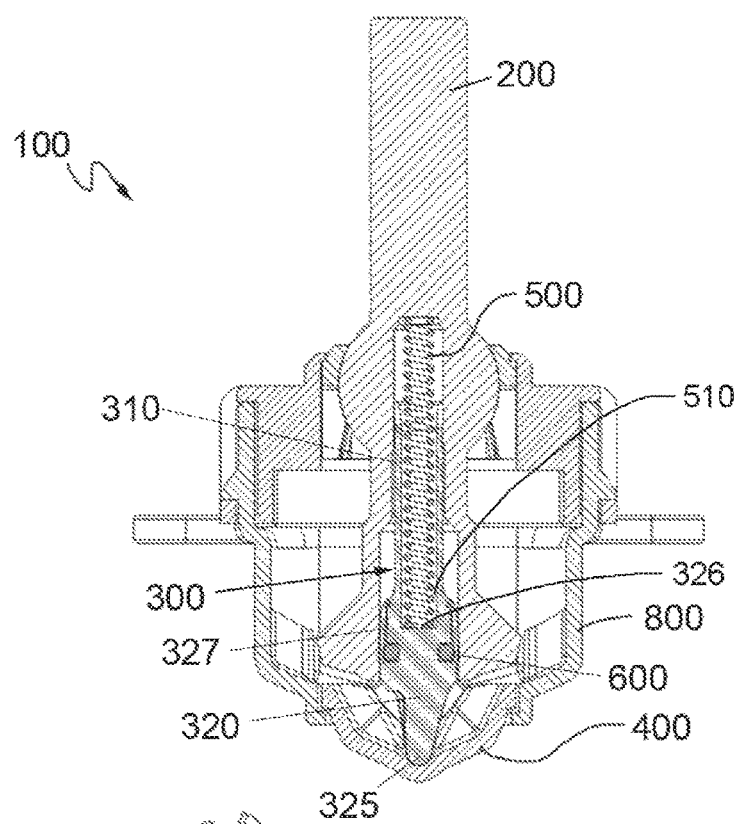
FIG. 8
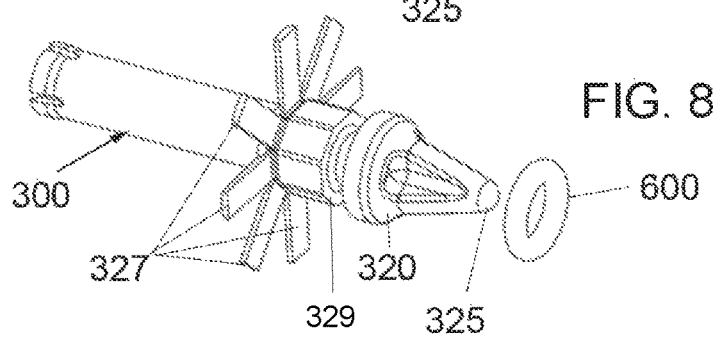
FIG. 9
FIG. 10
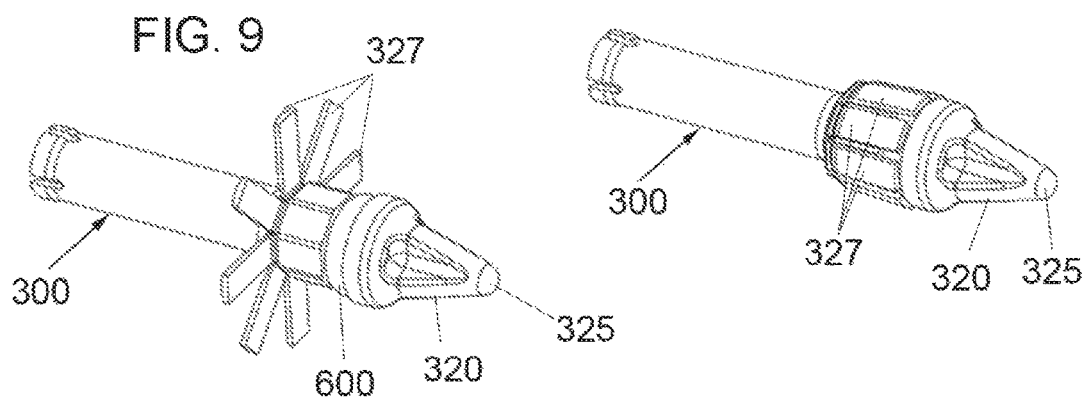

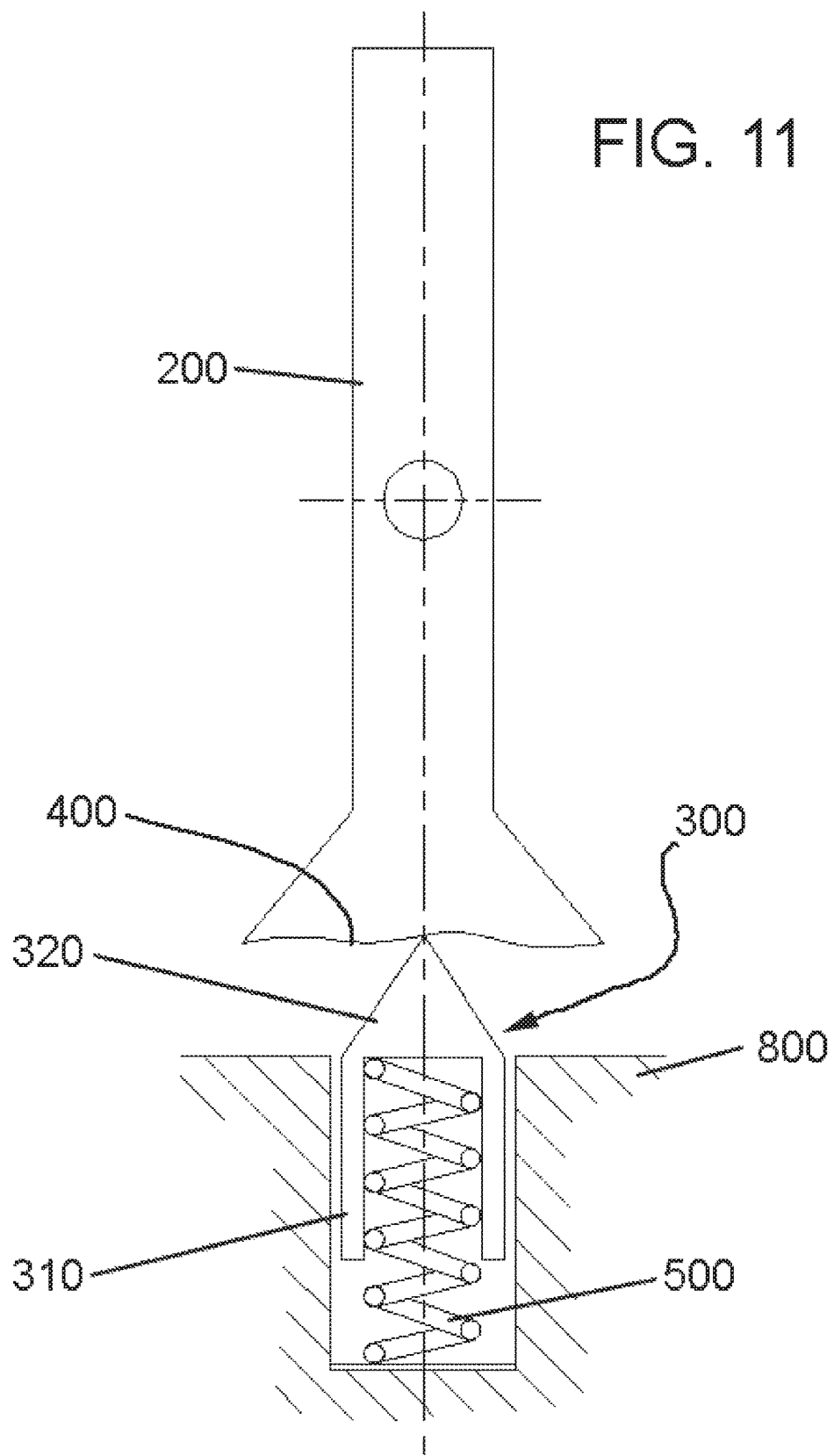

SHIFT SELECTOR MECHANISM FOR MOTOR VEHICLE TRANSMISSIONS

This application claims priority to European Application No. 15179896.4 filed Aug. 5, 2016, the contents of which are hereby incorporated by reference in its entirety for all purposes.

The present disclosure relates to shift mechanisms for controlling motor vehicle transmissions.

BACKGROUND

Motor vehicle transmissions, in particular motor vehicle automatic transmissions, comprise a shift mechanism that includes mutually movable parts such as for example a shift lever operable for selecting gearshift positions corresponding to different transmission gears, a movable spring biased plunger arranged to slide on a contoured surface as the shift lever is moved for selecting a gearshift position for giving the user a gearshift feel, etc.

A known issue associated with the above known shift mechanisms with movable parts relates to free plays due to manufacturing tolerances and wear during use which often results in that the gearshift feel is not as precise as desired.

U.S. Pat. No. 7,661,334 teaches a gearshift mechanism comprising a gearshift lever movable to a gearshift housing that addresses the above issue. A plunger having a conical shape is provided movable to the gearshift lever. A spring urges the plunger with an axial spring force against a contoured surface that is attached to the gearshift housing. An elastically deformable ring is provided between the plunger and the gearshift lever such that, as the plunger passes over the contoured surface, the compression spring is compressed, urging the plunger through the elastically deformable ring such that the conical areas of the slotted ring and those of the plunger slide on one another and the ring expands until it comes into contact with the inner wall of the gearshift lever. This results in centering the plunger relative to the gearshift lever.

There are other known solutions that address free plays between the mutually movable parts. However, they generate another issue that directly impacts user comfort as they generate an annoying noise when the shift lever is operated due to the rigidity of the mutually movable parts in contact.

There is therefore a need for shift selector mechanisms for motor vehicle transmissions capable of at least reducing the above disadvantages while still being effective in use.

SUMMARY

The present shift selector mechanism for motor vehicle transmissions comprises mutually movable first and second parts. The second part is movable relative to the first part. The second part can be arranged for example to at least partially slide within the first part.

A spring member, such as for example a compression spring, is provided. In use, the spring member acts upon the second part such that the second part is biased onto a contoured surface. As the first part is operated, e.g. for selecting a gearshift position, the second part slides on the contoured surface giving the user a gearshift feel.

A damper element being a part of or attached to one of the first part and the second part is provided. According to the described arrangement, in examples where the damper element is a part of or attached to the first part, the relative movement of the second part to the first part causes relative movement of the damper element to the second part without contacting the second part, whereas, in examples where the damper element is a part of or attached to the second part, the relative movement of the second part to the first part causes relative movement of the damper element to the first part without contacting the first part. Thus, relative movement between the first and second parts does not result in wearing down the damper element.

The fact that the spring member acts upon the second part means herein that the spring member is arranged acting directly on the second part, without affecting other parts of the shift selector mechanism. As a result, the spring force of the spring member does not affect friction between gearshift mechanism moving parts so that friction between them does not vary during the relative movement between the first part and the second part. As a result, the hardness of the damper element may be selected based simply on desired properties of friction and damping.

A damper element may be a flexible part, such as a pre-compressed member, for example an elastomeric member, also provided for absorbing forced vibrational energy, such as impacts or sudden shocks, to the first part. As used herein, a damper element relates to any element, made for example of rubber or similar material, that is suitable for at least partially reducing or absorbing shock impulses, vibrations and impacts. For example, when the second part collides against the slopes of the contoured surface, forced vibrational energy is transferred from the second part to the first part. The arrangement of the damper element is such that the forced vibrational energy is at least partially reduced or absorbed from the second part to the first part. As a consequence, noise due to the collision of the second part against the slopes of the contoured surface is mitigated.

The second part may be a plunger arranged to at least partially slide within the first part. The plunger may for example comprise a plunger stem and a plunger head. The plunger head may be provided with a free end adapted to slide on the contoured surface as the first part is moved, e.g. for selecting a gearshift position giving the user the above-mentioned gearshift feel. The plunger may also have a plunger stem. The plunger stem may be solid, with the spring member fitted outside the plunger stem, or it may be hollow, with the spring member fitted at least partially inside the plunger stem.

In specific examples, the first part may be a shift lever and the contoured surface may be a part of or may be attached to a shifter assembly housing. However, the first part may be a shifter assembly housing while the contoured surface may be a part of or may be attached to a shift lever.

In further examples, the first part may further comprise a bushing. The bushing may be a tubular part such as a sleeve or hollow shaft arranged for at least partially receiving the plunger therein such that the latter can slide thereto. In some examples, the damper element may be arranged surrounding a bushing end portion between the element with the cavity and the bushing end portion. It may be preferred that the bushing end portion extends past the damper element such that the bushing end portion is located between the damper element and the contoured surface. As a result, the damper element is prevented from directly contacting the second part as the first part is moved.

In order to retain the damper element in position to one of the first part and the second part, as they move to each other, a damper element receiving portion may be formed in one of the first and second parts for receiving the damper element such that it is retained therein.

The damper element may be configured so as to act upon the damper element receiving portion such that the damper element receiving portion is biased onto one of the first part and the second part. This configuration reduces free play between the first and second parts and further contributes to allowing selection of the hardness of the damper element based simply on desired properties of friction and damping.

It may be preferred that the damper element has at least one of a coupling protrusion or recess for engaging at least one corresponding coupling recess or protrusion formed at the bushing end portion. Other means for retaining the damper element in position are however not ruled out such as a number of flanges formed in the second part for surrounding the damper element or a number of flanges formed in the first part adapted to be surrounded by the damper element. In examples where the first part comprises a bushing, the bushing may be slotted to define a number of flanges adapted to be surrounded by the damper element.

These flanges are configured so as to provide a flexible retention of the damper element. As a result, the flanges cooperate with the damper element to reduce free plays between the first and second parts.

With the present shift selector mechanism free play between the movable parts are at least partially reduced. Also, impacts to the shift lever are dampened, which otherwise would be transmitted to the user. As a result, noise and vibrations are highly reduced such that the user experience is improved due to a dampened feeling.

It is important to note that the relative position of the damper element and the first or second parts is held constant while the damper element is prevented from directly contacting the first or second parts when in use. Therefore, the damper element is not affected by friction and wear and fatigue of the parts are, thus, nonexistent.

Also, with the present shift selector mechanism, a long travel for the plunger within the shift lever is no longer required for allowing a smooth gearshift feeling when the plunger passes over the contoured surface as the shift lever is moved when selecting a gearshift position.

Additional objects, advantages and features of several examples of the present shift selector mechanism will become apparent to those skilled in the art upon examination of the description, or may be learned by practice thereof.

BRIEF DESCRIPTION OF THE DRAWINGS

Particular examples of the present shift selector mechanism will be described in the following. The present description is given by way of non-limiting examples and with reference to the appended drawings.

In the drawings:

FIG. 1 is a sectional elevation showing a first example of the present shift selector mechanism;

FIG. 2 is a perspective view of the example of the shift selector mechanism shown in FIG. 1;

FIG. 3 is a sectional elevation showing a second example of the shift selector mechanism;

FIG. 4 is a perspective view of the example of the shift selector mechanism shown in FIG. 3;

FIG. 7 is a sectional elevation showing a fourth example of the shift selector mechanism;

FIGS. 8-10 are perspective views of the fourth example of the shift selector mechanism in FIG. 7 showing the way the damper element is mounted on the plunger, and FIG. 11 is a sectional elevation that diagrammatically shows a fifth example of the shift selector mechanism.

DETAILED DESCRIPTION OF EXAMPLES

Figure 5:
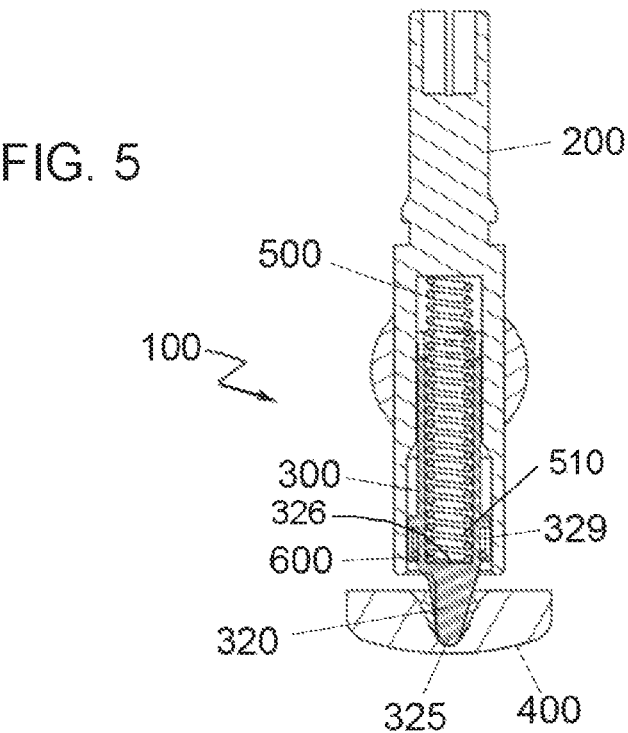
FIG. 5 is a sectional elevation showing a third example of the shift selector mechanism.

Several non-limiting examples of the present shift selector mechanism for controlling motor vehicle transmissions are described below with reference to the figures. In said examples, like reference numerals refer to like parts throughout the several views of the drawings.

The shift selector mechanism 100 comprises a first part and a second part which are movable relative to each other.

In the specific non-limiting examples shown in the drawings, the first part is a shift lever 200. In the examples shown, the reference numeral 200 could alternatively designate a bracket attached to the shift lever 200.

In the examples, the second part is a plunger 300 that is arranged to slide within the shift lever 200 when the shift lever 200 is operated. The plunger 300 comprises a plunger stem 310 and a plunger head 320.

The plunger 300 has a first, free end 325 located at the plunger head 320 adapted to slide on a contoured surface 400. Such contoured surface 400 is attached to a shifter assembly housing 800 that is shown in FIG. 7. The contoured surface 400 is configured with protrusions, recesses and slopes to give the user a gearshift feel as the shift lever 200 is moved thereon for selecting a gearshift position for controlling the motor vehicle transmission.

The plunger stem 310 is surrounded by or fits at least partially within a spring member in the form of a compression spring 500 for biasing the plunger 300 onto the contoured surface 400. The compression spring 500 is arranged to act directly upon the plunger 300 without acting on other parts of the mechanism 100. Specifically, a first end 510 of the compression spring 500 abuts the plunger head 320 at a surface 326, opposite to the abovementioned first, free end 325 of the plunger 300, such that the compression spring 500 acts upon the plunger head 320.

The shift selector mechanism 100 of the examples also comprises a damper element 600. The damper element is a pre-compressed member, specifically an elastomeric O-ring 600 configured for suitably absorbing shock impulses, vibration, impacts, etc. acting upon the shift lever 200 for example when returning to a stable position after being operated for selecting a gearshift position. The O-ring 600 is also configured for at least partially reducing noise due to the collision of the plunger 300 against the contoured surface 400.

FIGS. 1, 2 show a first example of the shift selector mechanism 100 and FIGS. 3, 4 show a second example of the shift selector mechanism 100. Both in said first and second examples of the shift selector mechanism 100, the plunger 300 has a solid plunger stem 310 such that the compression spring 500 is arranged surrounding it. In said first and second examples of the shift selector mechanism 100, the O-ring 600 is attached to an inner surface of the shift lever 200. A tubular part or bushing 700 is provided attached to the shift lever 200. The bushing 700 is attached to the interior of the shift lever 200 and is sized to receive the plunger 300 such that it is allowed to freely slide therein.

The bushing 700 has a first end portion 710 with a first opening 711 sized to receive the plunger head 320 such that the plunger head 320 is allowed to freely slide therein. The first end portion 710 is slotted such that a number of flanges are formed thereon. In both examples, the damper element 600 is arranged surrounding the slotted end portion 710 of the bushing 700.

The bushing 700 further has a second end portion 720, opposite to said first end portion 710, that is provided with a second opening 721 sized to receive the plunger stem 310 such that it is allowed to freely slide therein. The second end portion 720 also defines an abutment surface 722 upon which a second end 520 of the compression spring 500, opposite to the abovementioned first end 510 of the compression spring 500, abuts. Alternatively, the second end 520 of the compression spring 500 may be arranged to abut a surface of the shift lever 200.

In the first example shown in FIGS. 1 and 2, the slotted end portion 710 of the bushing 700 extends past the damper element 600 such that said bushing end portion 710 is located between the damper element 600 and the contoured surface 400.

In the second example shown in FIGS. 3 and 4, the damper element 600 is arranged surrounding the slotted end portion 710 of the bushing 700. In this second example of the shift selector mechanism 100, the damper element 600 has a radial coupling protrusion 610 for engaging a corresponding coupling recess 328 formed at the slotted end portion 710 of the bushing 700. Alternatively, the damper element 600 may be provided with a coupling recess for engaging a corresponding coupling protrusion formed at the slotted end portion 710 of the bushing 700.

In all the examples shown in FIGS. 1-4 of the drawings, the damper element 600 is retained in the shift lever 200 and prevented from directly contacting the plunger 300 when in use.

Figure 6:
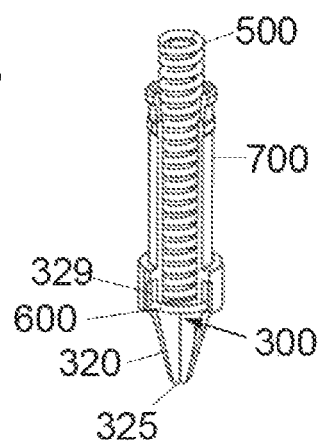
FIG. 6 is a perspective view of the example of the shift selector mechanism shown in FIG. 5.

FIGS. 5, 6 show a third example of the shift selector mechanism 100 and FIGS. 7-10 show a fourth example of the shift selector mechanism 100. In said third and fourth examples, the plunger 300 has a hollow plunger stem 310 such that the compression spring 500 is arranged partially inserted therein. In said examples, the O-ring 600 is attached to the plunger 300. Specifically, in said examples the O-ring 600 is attached to an outer surface of the plunger 300 in the vicinity of the plunger head 320.

In the third example shown in FIGS. 5 and 6, the plunger 300 includes a receiving portion 329 that is adapted to receive the damper element 600 retained in position therein. The receiving portion 329 may be slotted so as to define a number of flanges formed thereon. In use, the damper element 600 remains retained between the plunger receiving portion 329 and the plunger first end 325 prevented from directly contacting the shift lever 300 when in use. As a consequence, in the third example of the shift selector mechanism 100, no bushing is required.

In the fourth example shown in FIGS. 7-10, the plunger 300 is provided with a number of plunger folding flanges 327 which are shown in FIGS. 8-10. The folding flanges 327 serve the purpose of preventing the damper element 600 from directly contacting the shift lever 200 when in use. The damper element 600 is arranged surrounding the plunger 300 in a groove 328 provided in the vicinity of the pin head 320 and is in turn surrounded by the folding flanges 327. In use, the damper element 600 remains trapped between the plunger first end 325 and the folding flanges 327, retained in position in the plunger 300 and, thus, prevented from directly contacting the shift lever 300 when in use. As a consequence, in the fourth example of the shift selector mechanism 100, no bushing is required.

FIG. 11 shows a fifth example of the shift selector mechanism 100. In this specific example, the first part is the shifter assembly housing 800 and the contoured surface 400 is attached to the shift lever 200. The second part, i.e. the plunger 300, is adapted to slide on the contoured surface 400 and arranged to slide within the shifter assembly housing 800. When the shift lever 200 is operated, the plunger head 320 slides on the contoured surface 400 following the protrusions, recesses and slopes and causes the plunger 300 to slide within the shifter assembly housing 800.

When no gearshift operations are performed, the plunger head 320 remains in a stable gearshift position, usually referred to as idle or home gearshift position. The shift lever 200 automatically returns to the idle or home gearshift position after the shift lever 200 is moved to select a desired gearshift position. In the depicted examples, the idle position corresponds to a recess of the contoured surface 400.

Displacement of the shift lever 200 causes the plunger head 320 to abandon the idle position and start following a slope of the contoured surface 400. Such displacement generates a reaction force in the plunger head 320 with both a normal and a tangential component. The normal component is transmitted to the compression spring 500, which urges the plunger head 320 to remain in contact with the contoured surface 400. The tangential component is transmitted to the damper element 600, which deforms accordingly to absorb it. As a result, free play between the plunger head 320 and the shift lever 200 is eliminated by the deformation of the damper element 600. In the first and second examples, deformation of the damper element 600 causes deformation of the flanges formed at the slotted end portion 710 of the bushing 700 so as to remain in contact with the plunger 300. In other words, the flanges are urged against the plunger 300 by the damper element 600.

In the third and fourth examples, deformation of the damper element 600 causes deformation of the flanges formed at the plunger 300 so as to remain in contact with the shift lever 200. In other words, the flanges are urged against the shift lever 200 by the damper element 600.

Although only a number of particular examples and examples of the present shift selector mechanism have been disclosed herein, it will be understood by those skilled in the art that other alternative examples and/or uses and obvious modifications and equivalents thereof are possible.

Furthermore, the present disclosure covers all possible combinations of the particular examples described. Thus, the scope of the present disclosure should not be limited by particular examples, but should be determined only by a fair reading of the claims that follow.

Reference signs related to drawings and placed in parentheses in a claim, are solely for attempting to increase the intelligibility of the claim, and shall not be construed as limiting the scope of the claim.

The invention claimed is:

1. A shift selector mechanism for motor vehicle transmissions, comprising:
   a first part;
   a second part movable relative to the first part;
   a spring member acting upon the second part such that the second part is biased onto a contoured surface; and
   a damper element for absorbing impacts to the first part;
   wherein the damper element is a part of, or is attached to one of the first part and the second part, such that relative movement between the second part and the first part causes movement of the damper element relative to the other of the first part and the second part and without contacting the other of the first part and the second part;
   wherein the first part further comprises a bushing arranged such that the second part can slide within the bushing; and wherein a slotted end portion is formed in the bushing and the slotted end portion is surrounded by the damper element.

2. The mechanism according to claim 1, wherein the second part is a plunger arranged to at least partially slide within the first part.

3. The mechanism according to claim 1, wherein the first part comprises a damper element receiving portion receiving the damper element and retaining the damper element in position.

4. The mechanism according to claim 3, wherein the damper element is configured to act upon the damper element receiving portion such that the damper element receiving portion is biased onto the first part.

5. The mechanism according to claim 1, wherein the slotted end portion extends past the damper element such that the slotted end portion is located between the damper element and the contoured surface.

6. The mechanism according to claim 1, wherein the damper element has at least one of a coupling protrusion and a recess for engaging at least one corresponding coupling recess or protrusion formed at the slotted end portion.

7. The mechanism according to claim 1, wherein the damper element is a pre-compressed member.

8. The mechanism according to claim 1, wherein the damper element is an elastomeric member.

9. The mechanism according to claim 1, wherein the first part is a shift lever and the contoured surface is a part of or is attached to a shifter assembly housing.

10. The mechanism according to claim 1, wherein the first part is a shifter assembly housing and the contoured surface is a part of, or is attached to a shift lever.

11. A shift selector mechanism for motor vehicle transmissions, comprising:
a first part;
a second part movable relative to the first part;
a spring member acting upon the second part such that the second part is biased onto a contoured surface; and
a damper element;
wherein the damper element is a part of, or is attached to one of the first part and the second part, such that relative movement between the second part and the first part causes relative movement of the damper element relative to the other of the one of the first part and the second part and without contacting the other of the first part and the second part;
wherein the second part comprises a damper element receiving portion receiving the damper element and retaining the damper element in position; and
wherein the second part comprises a plurality of folding flanges that surround the damper element.

12. The mechanism according to claim 11, wherein the damper element is configured to act upon the damper element receiving portion such that the damper element receiving portion is biased onto the second part.

13. The mechanism according to claim 11, wherein the damper element is an o-ring located in a groove portion of the second part.

* * * * *